United States Patent [19]

Gathright et al.

[11] Patent Number: 5,033,177

[45] Date of Patent: Jul. 23, 1991

[54] SLEEVE BEARING PULLER AND INSTALLER

[75] Inventors: John B. Gathright; Grady C. Gathright, both of Smackover; James J. Calloway, Lincoln; N. T. Rutledge, Smackover, all of Ark.

[73] Assignee: Innovative Tools & Equipment Corporation, Smackover, Ark.

[21] Appl. No.: 404,960

[22] Filed: Sep. 8, 1989

[51] Int. Cl.[5] .............. B23P 19.04

[52] U.S. Cl. .............. 29/264; 29/280; 29/426.6; 29/898.01

[58] Field of Search .............. 29/244, 260-267, 29/256, 257, 258, 280, 281, 282, 426.5, 426.6, 898.01, 898.07, 898.08

[56] References Cited

U.S. PATENT DOCUMENTS

| | | | |
|---|---|---|---|
| 2,317,405 | 4/1943 | Rutten | 29/263 |
| 2,596,549 | 5/1952 | Hamilton | 29/263 |
| 3,327,377 | 6/1967 | German | 29/263 |
| 3,358,352 | 12/1967 | Wilcox | 292/263 |
| 3,408,724 | 11/1968 | Hoeijenbos | 29/263 |
| 4,026,002 | 5/1977 | Olson | 29/263 X |
| 4,624,041 | 11/1986 | Gathright et al. | 29/263 |
| 4,709,459 | 12/1987 | Klann | 29/263 |

*Primary Examiner*—Timothy V. Eley
*Assistant Examiner*—Peter Dungba Vo
*Attorney, Agent, or Firm*—Johnson & Gibbs

[57] ABSTRACT

Apparatus and methods for the removal and installation of sleeve bearings in a camshaft bore of an engine, such as a diesel engine. The device includes an operator rod, a bearing puller in accordance with U.S. Pat. No. 4,624,041, for engaging and pulling and/or pushing a sleeve bearing in the camshaft bore, apparatus for coupling the bearing puller along a rear end portion of the rod and at selected positions along the length of the rod for engaging sleeve bearings along the camshaft bore to both pull the bearings out of operating position and to reinstall bearings in operating positions, and apparatus for coupling the rod with a front face of the engine during the pulling and pushing of sleeve bearings for removal and installation of the bearings. In some embodiments of the apparatus the rod is operated by a wrench driven nut to pull and/or push the rod. In other embodiments the rod is operated by a hydraulic jack having an open hole piston fitting on the rod. Methods are described for operating the apparatus to remove and install the sleeve bearings along the camshaft bore and at an end location with the engine either in or out of a frame.

29 Claims, 7 Drawing Sheets

SLEEVE BEARING PULLER AND INSTALLER

This is a continuation-in-part of our Patent Application Ser. No. 212,571 filed June 28, 1988, allowed June 19, 1989 and now abandoned.

BACKGROUND OF THE INVENTION

This invention relates to the removal and installation of sleeve bearings, such particularly as in large diesel engines supporting the camshaft.

History of the Prior Art

In the past, the removal and installation of camshaft bearings in large engines, such as diesel engines, has been extremely difficult and expensive. A bearing puller was developed to provided substantially improved removal of bearings. Such puller is described and illustrated in U.S. Pat. No. 4,624,04 issued Nov. 25, 1986, to John B. Gathright and Grady C. Gathright, co-inventors of the apparatus and method of the present application. While the development of such patented bearing puller substantially improved the technology of servicing internal combustion engines, particularly large diesel engines, there still remained the need for a system for removal and installation of sleeve bearings using the patented device.

Prior art patents showing devices for sleeve bearing removal and installation include U.S. Pat. No. 2,317,405 to Rutten, U.S. Pat. No. 2,680,903 to Potter, U.S. Pat. No. 3,327,377 to German, U.S. Pat. No. 2,596,549 to Hamilton. The Rutten patent requires the use of a rod on which mandrels are mounted equal in number to the number of sleeve bearings to be manipulated including distinctly different structure from that presently disclosed by the Applicants and a different procedure of removal and installation of sleeve bearings. The Rutten patent also does not disclosure structure or procedure permitting the extraction and installation of a rear end bearing from an engine block where the block remains in the frame and the bearing must be approached from internal of the engine. The Potter patent does not show a sleeve bearing puller and installer and the use of a notched rod, as disclosed and claimed by Applicants Further, the German and Hamilton patents, similar to the Rutten patent, do not disclose the type of sleeve bearing puller utilized by Applicants and the structure and method of Applicant for using such a sleeve bearing device to remove and install bearings.

SUMMARY OF THE INVENTION

It is, therefore, an object of the invention to provide new and improved apparatus and methods for removing and re-installing sleeve bearings in engine blocks, such as large diesel engines.

It is another object of the invention to provide apparatus and method for employing the bearing puller described, illustrated, and claimed in U.S. Pat. No. 4,624,041 in a new and improved apparatus and method for both pulling and installing sleeve bearings.

It is another object of the invention to provide sleeve bearing pulling and installation apparatus and procedures for manual removal and installation of sleeve bearings in internal combustion engines.

It is a still further object of the invention to provide internal combustion engine sleeve bearing removal and installation apparatus which includes a power assisted device, such as a hydraulic cylinder, for providing the force necessary for the bearing removal and installation.

In accordance with the invention, there is provided bearing pulling and installation apparatus and methods which includes an operator rod of a size, diameter, and length for insertion into a camshaft bore of an engine, the rod having structure for supporting an expandable bearing handling device, such as disclosed in U.S. Pat. No. 4,624,041, and structure connectable with the rod and engageable with an engine block for moving the rod in one direction in a camshaft bore for pulling sleeve bearings from and pulling sleeve bearings into operating locations along the camshaft bore, and for pushing the rod in an opposite direction for installing sleeve bearings at selected positions along the camshaft bore. In one embodiment of the apparatus and method of the invention, the rod has longitudinally spaced annular notches for sequentially supporting the expandable bearing handling device along the length of the rod to sequentially remove and install sleeve bearings. In another embodiment of the apparatus and the method of the invention, the notched rod is utilized with the removal and installation functions being performed along the free end of the rod while the rod is sequentially engaged at the notches by power assist apparatus for removal and installation of the sleeve bearings. In a still further embodiment of the invention a smooth operating rod having means at the free end thereof couples into the patented bearing handling device for installing an end bearing into a blind bore of an engine. The apparatus for pushing and/or pulling the rod may be a threaded drive nut or a hydraulic jack.

BRIEF DESCRIPTION OF THE DRAWINGS

The foregoing objects and advantages together with specific preferred embodiments of the apparatus and method of the invention will be better understood from the following detailed description taken in conjunction with the accompanying drawings wherein.

DETAILED DESCRIPTION PREFERRED EMBODIMENTS

Figures 7, 8:
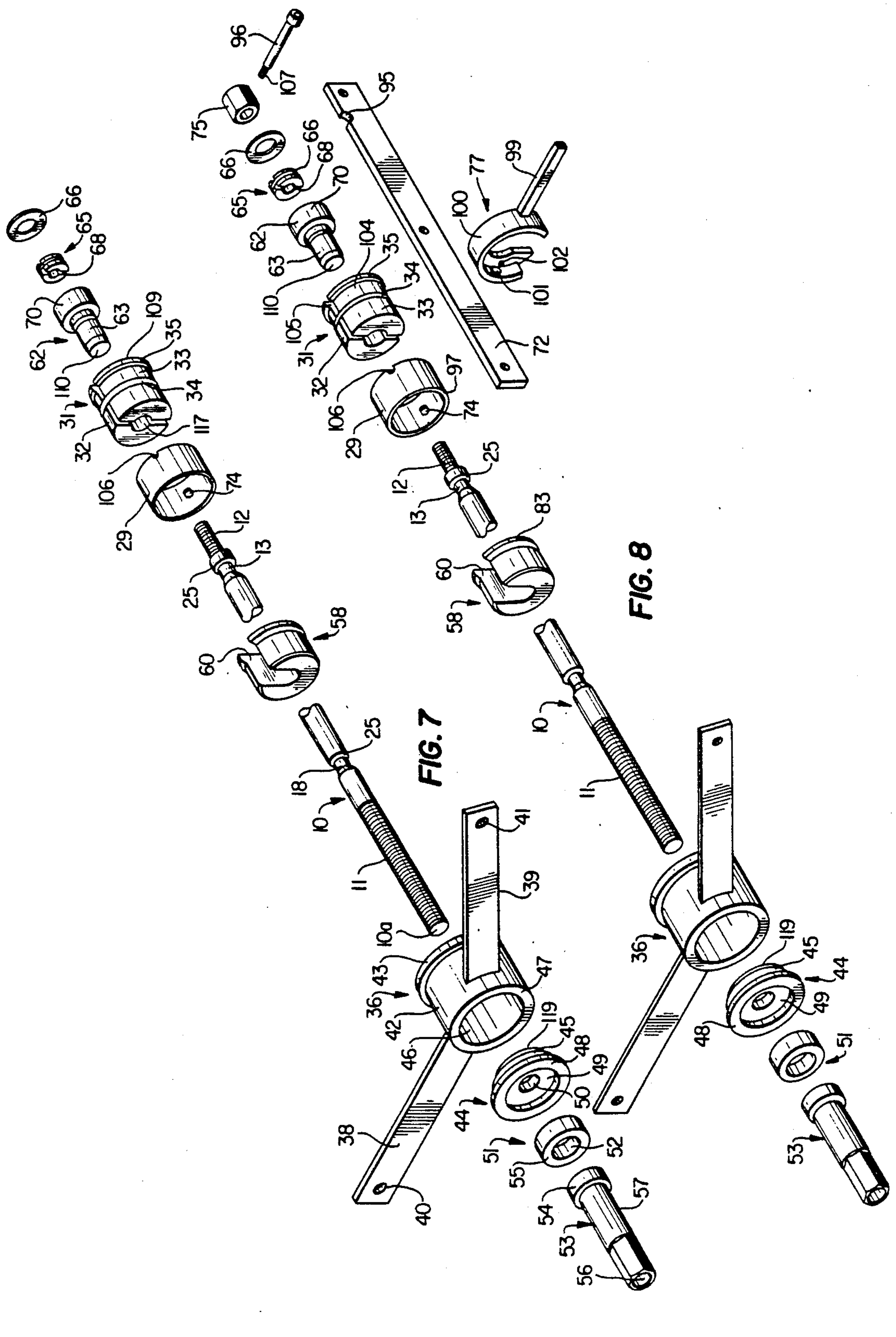
FIG. 7 is an exploded perspective view of one bearing pulling assembly of the invention.
FIG. 8 is an exploded view in perspective similar to FIG. 7 showing the combination of the invention used for the installation of bearings in a camshaft bore.

The tool system of the invention employed for removal of sleeve bearings from a camshaft bore of an engine illustrated in FIG. 7 includes a notched operator rod 10, the bearing handling device 31 of U.S. Pat. No. 4,624,041, a wing hub 36 for coupling the pulling end 10*a* of the rod 10 with the engine block, a pull nut 53, a thrust bearing 51, and a pull plate 44, an open rod guide 58 for supporting the rod in the camshaft bore, an expander 62 for connecting the bearing puller 31 with the rod 10, and a expandable snap ring assembly 65 with a push washer 66 for coupling the puller with the free end of the rod 10. A typical sleeve bearing 29 is shown in FIG. 7 in a pulling position relative to the other parts of the bearing puller illustrated. The assembly shown in FIG. 7 sequentially removes the camshaft sleeve bearings from an engine as the puller is moved along the length of the rod for the removal of each of the bearings. The bearings remain on the rod until all of the bearings other than the last or rear bearing have been removed Referring to FIG. 11-11A, a notched operator rod 10 has threads on the opposite ends 11 and 12, with the diameter of the threads at 11 being the same as diameter of the cylindrical areas, of the rod 10, and the diameter of the threads 12 being slightly less than the diameter of the cylindrical areas of the rod. The rod 10 has a series of congruent notches 13, 14, 15, 16, 17 and 18 at precise intervals, which notches consist of two distinct portions—a cylindrical portion 19 and a tapered portion 20. The diameter of the base 21 of the tapered portion 20 is the same as diameter of the cylindrical portions of the rod 10 which is a cylindrical shaft except for threads 11 and 12, congruent notches 13-18 and flat notches 22 and 23. As the diameters of the cylindrical portions 19 of the congruent notches are slightly less than the diameter of the cylindrical area of the rod 10 it joins, and each have the same center line 24, their conjunction creates an annular shoulder 25, the face of which is perpendicular to the center line 24 of the congruent notches 13-18 and the cylindrical portions of the rod 10. The tapered portion 20 of the congruent notches has two bases 21 and 26 The diameter of base 21 is same as diameter of cylindrical portions of the rod 10 and diameter of base 26 is same as diameter of cylindrical sections 19 of the congruent notches.

Figure 6:
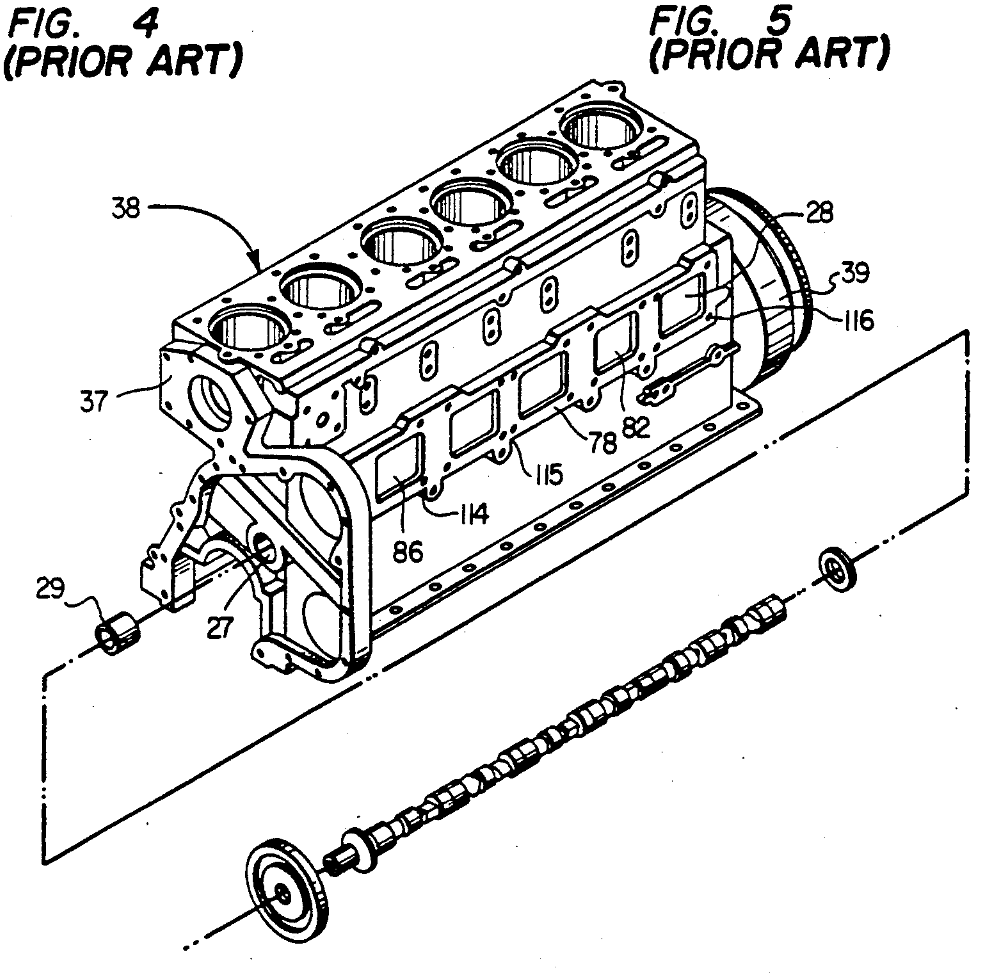
FIG. 6 (PRIOR ART)
FIG. 6 is an exploded perspective view of an engine block, the camshaft of the engine, and a camshaft sleeve bearing of the engine showing the camshaft and bearing removed from the camshaft bore.

The length of the notched operator rod 10 is sufficient that when inserted into the camshaft bore 27, represented in FIG. 6, the threads 12 are visible through rear inspection port 28, with the threads 11 extending outside camshaft bore 27. The congruent notches 13-18 occur at precise intervals, their location being relative to location of the sleeve bearings 29 along the camshaft bore of the diesel engine. There are two sets of flat notches 22 and 23 on the rod 10. Notches 22 and 23 are visible through a front port (not visible on FIG. 6) and a rear inspection port 28, respectively, when the rod 10 is inserted into camshaft bore 27 until threads 12 are visible in rear inspection port 28. Each set of notches 22 and 23 is square and occur on either side of the rod in parallel planes. The depth of the notches is slight. The notches provide a flat surface where a typical end wrench can be placed to keep the rod 10 and assembly from rotating, if desired.

Figure 2:
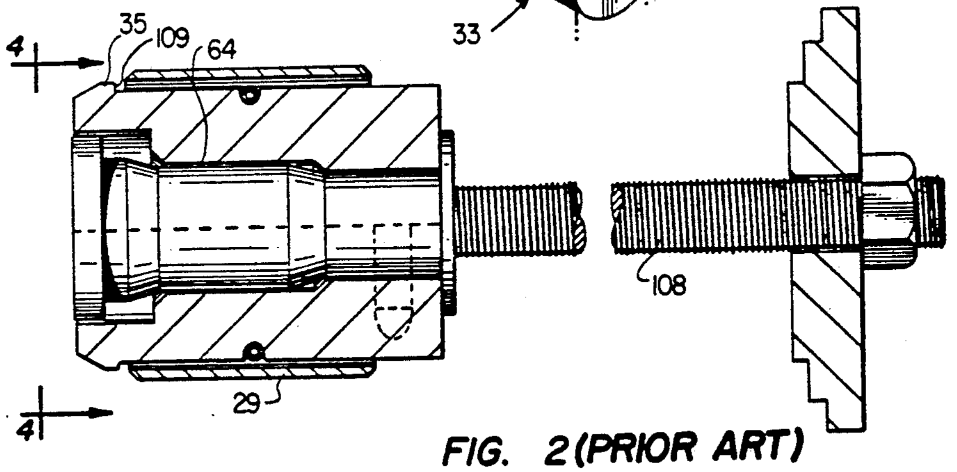
FIG. 2 (PRIOR ART)
FIG. 2 is a side view in section and elevation of the puller of FIG. 1 showing the sleeve bearing extractors compressed together in a sleeve bearing.
Figure 3:
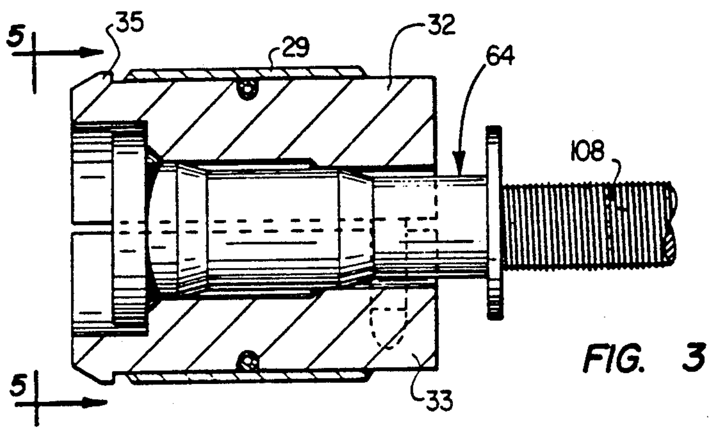
FIG. 3 (PRIOR ART)
FIG. 3 is a fragmentary side view in section and elevation of the device of FIG. 2 with the sleeve extractors expanded within a sleeve bearing.
Figure 4:
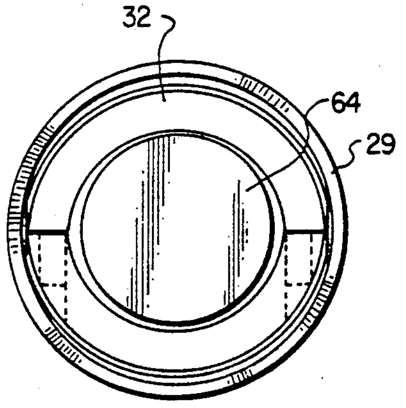
FIG. 4 (PRIOR ART)
FIG. 4 is a view in elevation along the line 4—4 of FIG. 2.
Figure 5:
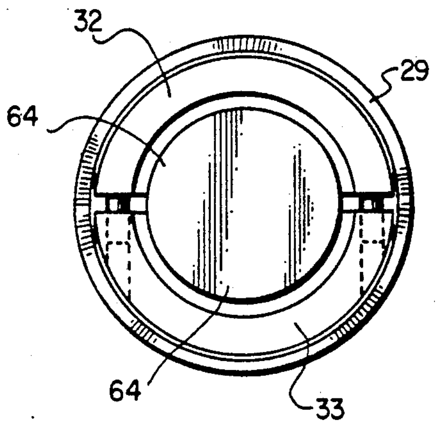
FIG. 5 (PRIOR ART)
FIG. 5 is a view in elevation along the line 5—5 of FIG. 3.

The rod 10 is used in conjunction with the sleeve bearing puller 31, as shown in FIGS., 1-5, to extract and install sleeve bearing 29. The sleeve bearing puller 31, U.S. Pat. No. 4,624,041, includes a pair of half-cylinder shaped sleeves 32 and 33, or extractors, resiliently held together by a spring 34, movable laterally in parallel relationship between a contracted insertion mode represented in FIGS. 2 and 4 and an expanded pulling mode shown in FIGS. 3 and 5. The extractors 32 and 33 are shifted between the first and second modes by longitudinal motion only of an expander mandrel 64 as shown in FIG. 3 relative to the extractors. The first contracted mode is used for inserting the puller into a sleeve bearing such as the camshaft bushing 29 shown in the drawings.

Figure 1:
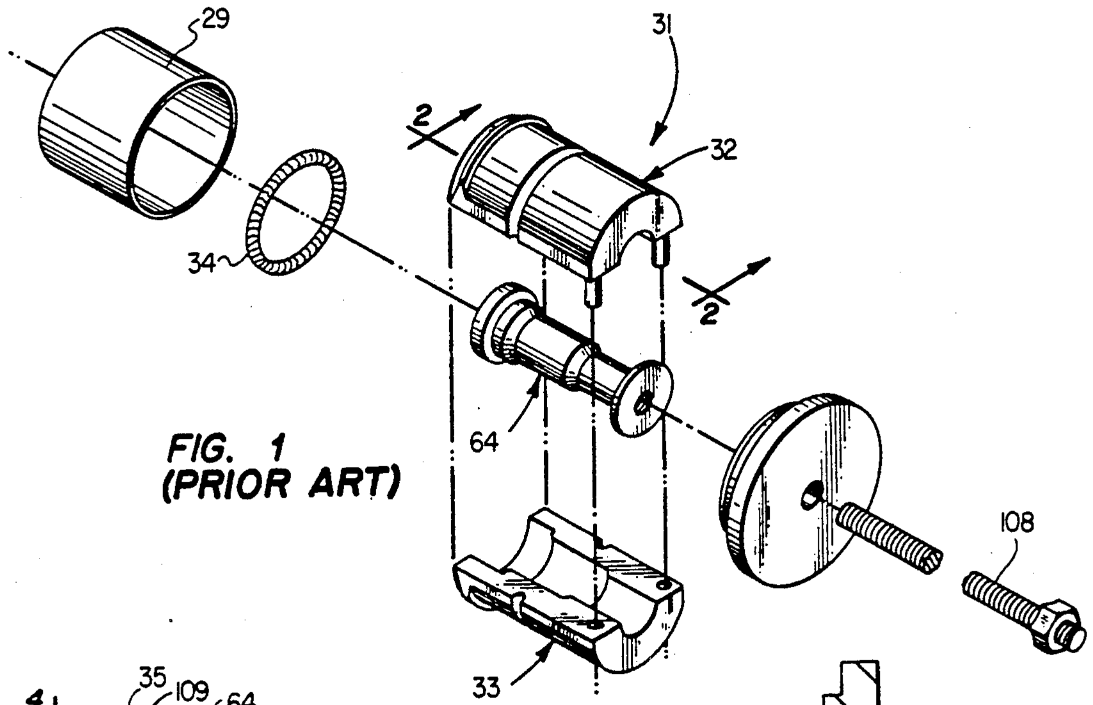
FIG. 1 (PRIOR ART)
FIG. 1 is an exploded view in perspective of the prior art sleeve bearing puller of U.S. Pat. No. 4,624,041.

The external configuration of the expander mandrel 64, when moved longitudinally by a pull rod 108 attached to the mandrel 64, as in FIG. 1, interacts with the internal configuration of the sleeve extractors, 32 and 33, causing the extractors to expand in parallel relation. The peripheral end flange 35 provides a pulling shoulder 109 that, when the extractors are in the second expanded mode, fully engage an end face of the sleeve bearing 29, so that the pulling shoulder 109 is capable of applying sufficient force on the sleeve bearing to move the sleeve bearing. The initial function of sleeve bearing puller 31 was to provide a device to extract a sleeve bearing from a difficult location, as the rear camshaft bushing of certain diesel engines installed in trucks It is the function of the notched puller/installer rod 10, FIGS. 7-9, to provide a device to use in conjunction with the sleeve bearing puller 31 and other related devices that will extract or install sleeve bearings 29, regardless of their location within the engine. Heretofore, removal of such bearings has been by using a bearing driver. Whether removing or installing a bearing, the driver is placed against end face of the bearing and the driver struck by a hammer until the bearing is removed or installed, as the case may be. This method of removing or installing bearings can cause damage to the bearing or the bearing bore Damage to a removed bearing is of little consequence, but damage to a new bearing or bearing bore can result in serious problems.

After the notched operator rod 10 is inserted into the camshaft bore 27, FIG. 6, the wing hub 36 is attached to the face of the engine block 37. Each of the two wings 38–39 have bolt holes 40 and 41 that align with specific bolt bores on the face 32 of the engine block 38 The hub consist of two portions: one, a cylinder portion 42, and the other an annular flange 43. The inside diameters of the annular flange 43 and the cylinder 42 are the same, but are larger than the diameter of the camshaft bore 29. Of course, the outside diameter of the annular flange is larger than these two, providing a larger surface area to stabilize the hub 36 against the face of the engine block. A pull plate 44, FIG. 8, with two pulling shoulders 45 and 119 is inserted into the wing hub bore 46 with pull shoulder 45 resting against the exposed end face 47 of the cylinder portion 42 of the wing hub 36. The exposed face 48 of the pull plate 44 is provided with a counterbore 49 with a depth approximately half that of the over all plate 44. The pull plate is also provided with a bore hole 50 with a diameter sufficient for the rod 10 to be easily inserted. A thrust bearing 51 is inserted into counterbore 49 in the pull plate 44. When the thrust bearing 51 is inserted into the counterbore 49 in the pull plate, a portion remains exposed. Thus, the rod 10 can be easily inserted through the respective bore holes, wing hub bore 46, pull plate bore 50, and thrust bearing bore 52. In such a position, the pull nut 53 can be screwed onto the threaded rod end 11. The pull nut has a cylindrical flange base 54, the end face of which rests against the exposed face 55 of the thrust bearing 51. Further, the pull nut 53 is provided with a borehole 56 with internal threads on the base end 54 engageable with the rod threads 11. The opposite end of the borehole is unthread. Thus, when assembled, rotation of the pull nut 53 will cause the rod 10 and any moveable attachments to travel longitudinally. When in use, the rod 10 may need to be held parallel to the longitudinal axis of the camshaft bore 27. Two type of rod guides 58, FIGS. 7–9, and 59, FIG. 10, can be utilized. The open rod guide 58 can be installed at any time. The opening 60 is slightly larger than the diameter of the rod 10 at its largest diameter. The outside diameter of the guide 58 itself is slightly less than the inside diameter of a sleeve bearing bore 29. Thus, when placed in a bearing bore with bearing in place, the rod is held parallel to the longitudinal axis of the camshaft bore 27. The guide 59 shares all characteristics of guide 58 except for the opening 61. Accordingly, to use guide 59 it must be placed over end 12 of rod as it is being inserted into the camshaft bore 27. Of course, guide 58 may be removed at anytime, whereas guide 59 can be removed only by longitudinal movement of rod 10 until end 12 passes through guide bore 61.

Assembly of the wing hub 36, the pull plate 44, the thrust bearing 51 and the pull nut 53, at the end 12 of the rod must occur before removal or installation of bearings can be undertaken.

Figure 12:
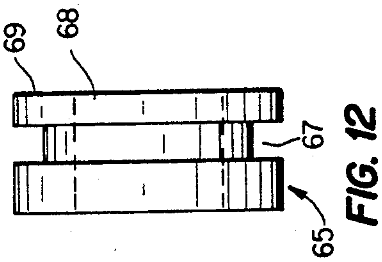
FIG. 12 is a side view in elevation of a split lock ring used in the assembly of FIG. 7.
Figure 12A:
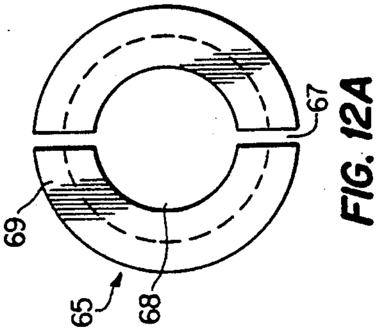
FIG. 12A is a left end view of the split look ring assembly of FIG.. 12.

In a typical situation, as represented in FIG. 6, worn bearings are removed and replaced with new ones. To remove any bearing other than rear bearing, place sleeve bearing puller 31 over the end 12 of the rod 10 with the peripheral end flange 35 toward rod end 12. Push the sleeve bearing puller 31 along rod 10 until it is between the bearing 29 to be pulled and end 12. Next, place the smooth expander 62, which is provided with a center bore 110 sufficiently large enough to be placed over rod 10, over the end 12, small end 63 first. The external configuration of the smooth expander resembles that of the expander mandrel 64. Thus, when the small end 63 of the smooth expander 62 is inserted into the split bearing puller bore 117, the puller changes from contracted insertion mode to expanded pulling mode. When expanded, the sleeve bearing puller 31 and the smooth expander 62 are pushed forward into the sleeve bearing 29 until the peripheral end flange 35 fully engages the end face of the sleeve bearing 29 As forward longitudinal movement of the pull nut 53 would result in the rod being extracted, a snap ring 65 is provided, which is placed over rod end 12 followed by a push washer 66. The snap ring 65 FIGS. 12 and 12A consists of a split cylinder with an annular groove 67 in the center of the cylinder halves which houses a spring which holds the halves together The bore hole 68 of the snap ring 65 has a diameter less than that of the rod 10 but the same as the cylindrical portion 19 of the congruent notches 13–18. Thus, when pushed forward from rod end 12, the snap ring 65 firmly grasps the cylindrical portion 19 of the first congruent notch 13. The end face 69 of the snap ring 65 rests against the annular shoulder 25 of the notch. Thus, the snap ring 65 in its contracted mode cannot move beyond the plane of the annular shoulder 25 of the notch. The rod 10 can now be pulled forward, bringing with it the snap ring 65 in place. The large end 70 of the smooth expander 62 provides a cylindrical bore in which the snap ring 65 fits. As the pull nut 53 is turned clockwise, the inability of the smooth expander 62 and split bearing puller 31 to pass beyond the plane of the annular shoulder 25 of the congruent notch 13, due to the presence of the snap ring 65, creates tension on the rod 10. As the peripheral end flange 35 of the sleeve bearing puller 31 in its expanded pulling mode engages the end face of the bearing, clockwise rotation of the pull nut 53 causes the sleeve bearing puller 31 to move the bearing 29 forward, thus, removing the bearing 29.

Figure 11:
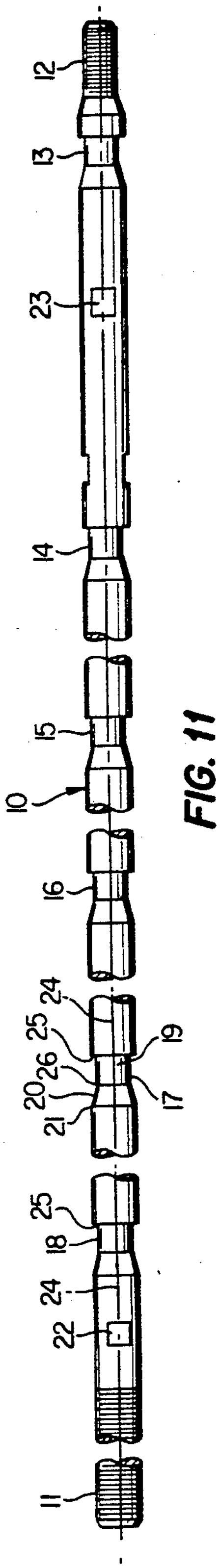
FIG. 11 is a fragmentary longitudinal view of the notched operator rod used for bearing removal and installation in the assembly of FIG. 7.
Figure 14:
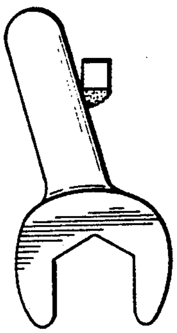
FIG. 14 is a side view in elevation of a special wrench used in the operation of the systems of the invention.

The rod 10 is provided with a set of flat notches 22 and 23 on opposite ends of the rod, FIG. 11. When the rod is fully inserted, notches 22 are visible through a front inspection port (not shown in FIG. 6). Notches 23 are visible through the rear inspection port 28. The notches 22 and 23 are provided so a common end wrench of appropriate size can be placed on the notches, its handle extending through the inspection port, and when pulled downward, catches against the base of the inspection port. The end wrench used at notch 22 can be supplemented with a slide, not shown, perpendicular to the handle and so located that the slide falls parallel with and immediately inside the top face 98 of the flat bar guide 72. The wrench itself keeps the rod 10 from turning and the slide keeps the wrench in a more stable position as the rod 10 travels longitudinal toward front of engine block.

After extraction of a bearing 29, it may be removed from the sleeve bearing puller 31 by changing the mode of the puller by manipulating it by hand. The extracted bearing will, of course, remain on rod 10 until all bearings are removed and rod is unassembled. To remove next bearing, move the sleeve bearing puller 31, the smooth expander 62, the snap ring 65, and the push washer 66 through the vacant bearing hole. The snap ring 65 will snap in place at the next congruent notch 14, as before. Again, the sleeve bearing puller 31 and the smooth expander 62 are engaged and inserted into bearing to be pulled. The remainder of the process is repetitive.

Figures 9, 10:
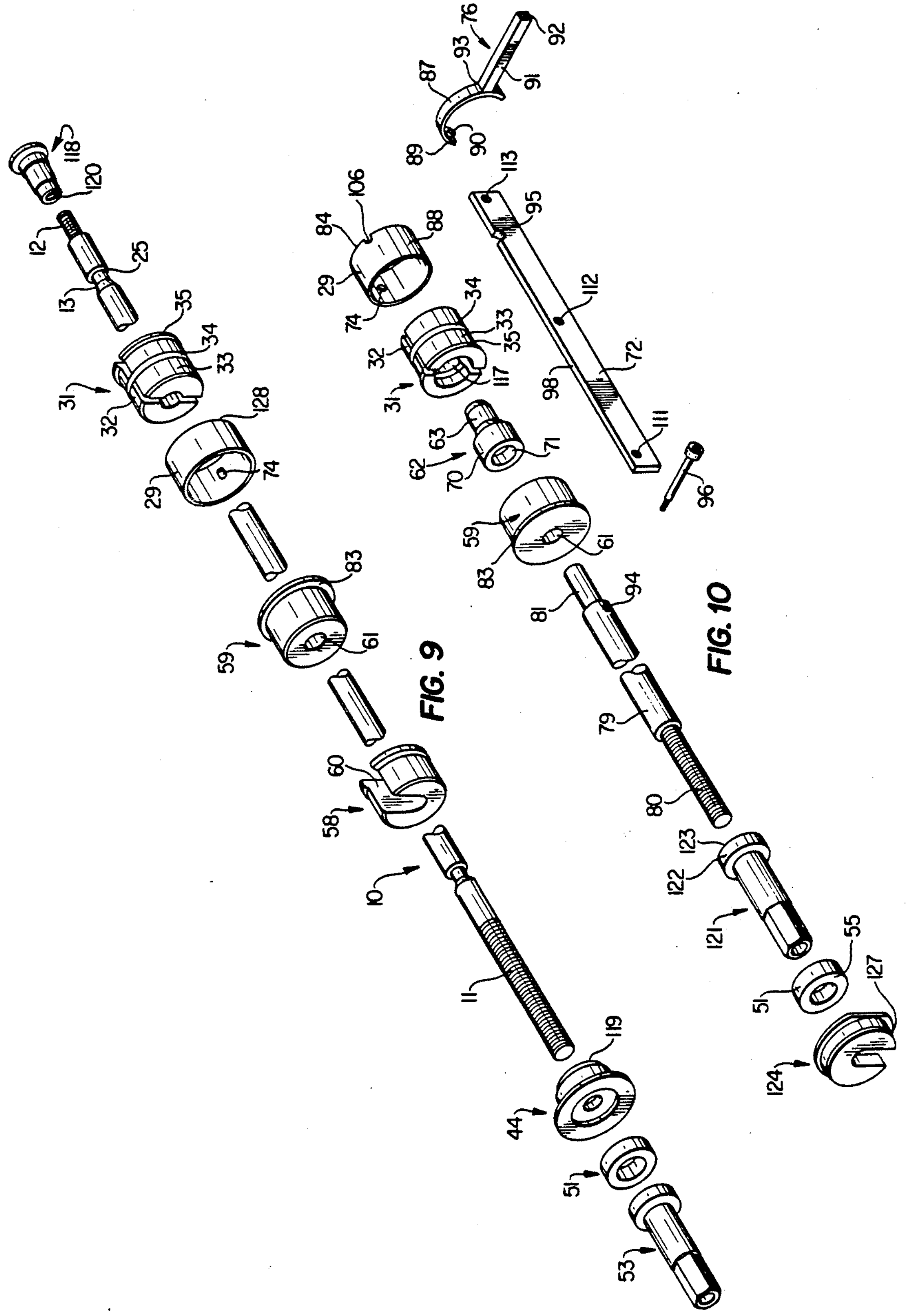
FIG. 9 is an exploded view in perspective of the combination apparatus of the invention used for pulling the last of the sleeve bearings at the rear end of the camshaft bore.
FIG. 10 is an exploded perspective view of the combination apparatus of the invention used for pushing the last or rear sleeve bearing into the camshaft bore of an engine.

When the rod 10 is used with wing hub 36 attached, as in FIG. 7, it extends far enough into the camshaft bore 27 to remove the next to the rear bearing. It is not, however, long enough to extend into rear bearing bore but, with wing hub 36 removed as in FIG. 9, it will. Referring to FIG. 9, the pull plate 44 has an annular shoulder 119, the diameter of which is slightly less than diameter of camshaft bore hole 27. Thus, pull plate 44 is placed into outside bore hole of the engine block with shoulder 119 against bore of engine block. The thrust bearing 51 and pull nut 53 are assembled as before. The sleeve bearing puller 31 is placed over the end 12, the peripheral end flange 35 to the rear of engine block. The threaded expander 118 has internal threads 120 which are screwed on threads 12. The sleeve bearing puller 31 can be pushed onto the threaded expander 118. With the puller 31 in contracted insertion mode, it is inserted through the last bearing until the pulling flange 35 is beyond the back or inside edge face 128 of the bearing 29. The pull nut 53 is then turned pulling the rod 79 with a force so that the pulling shoulder 109, particularly on the lower extractor engages the end edge 128 of the bearing 29. The pull not 53 is turned until the bearing 29 is removed.

Normally, after all of the old worn bearings have been removed new bearings are installed in the camshaft bore. The back bearing, if the engine is in the frame, must be pushed into place using the assembly illustrated in FIG. 10. Thereafter the arrangement of FIG. 8 is employed to pull the remaining bearings into place. In preparation for installing the assembly of FIG. 10, the pull nut 53, pull plate 44, and the thrust bearing 51 are removed. The rod 10 also is removed from the block bore and the bearing handling device 31 and threaded expander 118 are removed from the rod 10.

The typical engine block has oil service holes, not shown, along the camshaft bore 27. These holes need to align with sleeve bearing oil holes so as not to restrict oil flow in block. The camshaft bearing 29 has oil holes 74 so situated that when properly installed the bearing oil holes 74 are aligned with the block oil service holes, the latter holes being slightly larger than the former Additionally, the bearing 29 must be inserted to a proper depth into the camshaft bore 27 so that the bearing oil holes 74 are neither in front of nor behind the oil service holes.

Available art employs a bearing driver and a rod. The driver itself is placed against the bearing 29. The driver rod extends beyond the camshaft bore hole 27 and is struck by an object, either a slide hammer or a hand held hammer. This process is often abusive to the bearing 29, can damage it and/or the camshaft bore itself 27. Too, the process requires the mechanic to periodically check the position of the bearing oil holes relative to the oil service holes. Or, a second individual can do this.

Figure 13:
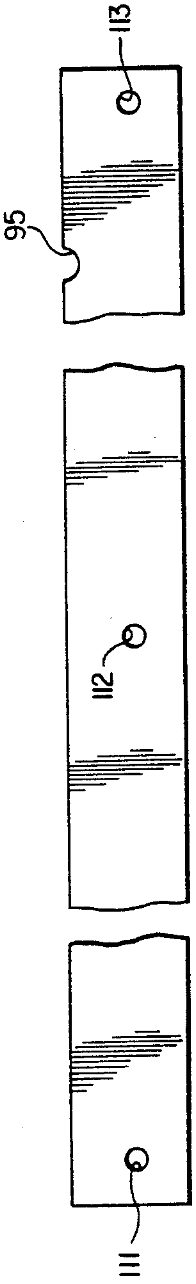
FIG. 13 is a longitudinal side view in elevation of the alignment bar securable along the side of the engine block for alignment of the sleeve bearings during installation.

The uncertainty of and time consumed by these processes are eliminated by employment of a flat bar guide 72, FIG. 13, bearing stop line up tool 75 and bearing stop line up bolt 96, FIG. 8, rear bearing line up tool 76, FIG. 10, or front bearing line up tool 77, FIG. 8, in conjunction with rods 10 or 79, bearing puller 31 and smooth expander 62.

The sleeve bearing puller 31 can be utilized to pull into place all bearings 29 that do not lie with a blind hole such as the rear main bearing in a diesel engine. It can be utilized to push the rear bearing in place.

The flat bar guide 72 is a rectangular section of flat iron the length of which must extend from the inside face of front inspection port 30 to the rear vertical face of the rear inspection port 28, FIG. 6. The flat bar guide 72 is bolted to the side of the engine block 78 with bolts being placed at holes 111, 112 and 113, which holes are made to coincide with the internal threads of engine block made serviceable when the cover plate is removed from the side of the engine block 78. The height of the flat bar guide 72 causes its top face 98, which is parallel to the notched operator rod 10 when stabilized, to be level with center line 24 of the rod 10. The end of the flat bar guide 72 which covers part of the rear inspection port 28 is notched at 95. The assembly of FIG. 10 is then installed in the camshaft bore. The rear bearing push rod 79, which has external threads 80 on one end and a cylindrical shaft 81 on the other, the diameter of each being equal but less than the remainder of the push rod 79, otherwise cylindrical, is inserted into the camshaft bore 27, end 81 first. When the shaft end 81 of the push rod 79 is visible in the next to the last inspection port 82, a solid rod guide 59 is placed over the shaft end 81 and inserted into the bearing hole, two bearing bore holes toward front of the engine block with shoulder 83 of solid rod guide 59 to the rear of assembly. The outside diameter of the part of the solid rod guide 59 insertable into bearing hole is slightly less than the diameter of the hole The solid rod guide 59 serves to hold the push rod 79 parallel to the center of the camshaft bores. The shoulder portion 83 of the solid rod guide 59 catches on the face end of the bearing bore hole which prevents the guide 59 from working through bore hole.

The diameter of the cylindrical bore hole 61 of the solid rod guide 59 is slightly larger than the diameter of the push rod 79, thus, maximizing the capability of the guide 59 in stabilizing the push rod 79 parallel to the center of the camshaft bore. The stabilized push rod 79 is inserted into the camshaft bore until the cylindrical shaft end 81 is visible in the rear inspection port 28, at which time the larger cylindrical bore 71 in the large end 70 of the smooth expander 62 is placed onto the cylindrical shaft portion 81 of the rear bearing push rod 79. The inside dimensions of the bore 117 in the split bearing puller 31 are slightly larger than the respective outside dimensions of the small end 63 of smooth expander 62. The external configuration of the inserted portion 63 of the smooth expander 31 interacts with the internal configuration of the sleeve bearing puller 31, as the pulling mandrel 64 does, causing the sleeve bearing puller 31 to change into the expanded mode. Thus, the rear bearing is placed around the expanded sleeve bearing puller 31 as before.

The rod 79 is pushed until leading edge 84 of bearing 29 is tangent with opening of rear bearing bore 85 at which time threads 80 extend outside camshaft bore 27. Pull nut 121, which has left hand threads, is screwed onto threads 80 until its annular base 122 is visible in the front inspection port 30.

The thrust bearing 51 is placed over pull nut 121 until it touches end face 123 of base 122. The split pull plate 124 is placed on the rod 79 inside of the access opening 86 and pushed until the base of the counterbore of the plate 124 is against exposed face 55 of the thrust washer 51. The diameter of the annular shoulder 127 of the split pull plate 124 is slightly less than diameter of the camshaft bore 27. Thus, when rod 79 is pulled, the shoulder 127 fits inside the bearing bore hole where front bearing goes. When the left hand push nut 121 is turned clockwise in an attempt to pull rod 79, the split pull plate 124 is caught by the bearing bOre hOle, thus causing push rod 79 to move forward. As it does so, the end face of the rear bearing is pushed by the shoulder 109 of sleeve bearing puller 31 and the bearing is carried into its bore-hole.

The oil services holes 74 in the rear bearing 29 must be properly aligned. The rear bearing line-up tool 76 consists of a circular arc 87 of approximately 150 degrees and a handle 91. The width of the arc is approximately ¼ the length of the rear bearing 29. The underneath surface of the arc 87 lies snugly against the external surface 88 of the rear bearing 29. Near the terminal end 89 of the rear bearing line up tool 76 on the underneath surface is a small cylindrical peg 90 with a height and diameter each slightly less than the depth and diameter of the oil holes 74 in bearings 29. Thus, when the rear bearing line up tool 76 is placed against the external surface 88 of the rear bearing 29, which can easily be rotated as it resides around the sleeve bearing puller 31 in its expanded mode, the cylindrical peg 90 can fit into oil hole 74 in the bearing. Arc 87 is attached to a rectangular handle 91. The handle 91 is of sufficient length that its non attached end 92, extends slightly beyond the vertical plane of the flat bar guide 72 when the peg 90 is inserted into the oil hole 74 with the bearing 29 placed on the sleeve bearing puller 31 in its expanded mode. The attached end 93 of the handle 91 is at a point on the arc 87 that creates an arc from the point 93 to the peg 90 that is equal in degrees to the arc existing from the oil service hole in the engine block and the point of its intersection on the flat bar guide extended. Thus, when the peg 90 is inserted into the oil hole 74 and the handle 91 pulled downward until it touches the flat bar guide 72, the oil hole 74 is in exact relation with the oil services hole causing the bearing holes 74 to perfectly align with the block oil service hole. With the rear leading end edge 85 of the rear bearing 29 tangent with the bearing bore 85, aligned as described, remove the rear bearing line up tool 76.

A distance toward front of the engine block there is an internally threaded bore 94 in the push rod 79. The diameter of the bore is about ⅓ the diameter of the push rod 79. The depth of the bore is about ½ the diameter of the push rod 79, the breadth and depth being small enough to not weaken the push rod 79. The location of the bore 94 is related to the semi-circular notch 95 in the flat bar guide 72 when the leading edge 84 of the rear bearing 29 is tangent with the rear bearing bore 85. The line segment existing between the center of the bore 94 and the center of the semi-circular notch 95 is equal to the line segment existing between the leading edge 84 of the rear bearing 29 and the center of the oil service holes 73 in the rear engine bore 85. The bearing-line up bolt 96 is screwed into the bore 94. The diameter of bolt 96 is slightly less than the diameter of the notch 95 in the flat bar guide 72 The bearing line-up bolt 96 once screwed into the threads 94 can be pulled downward until the underneath side of the bolt 96 is in contact with the top face 98 of the flat bar guide. The push bar 79 has a cylindrical reduced end 81 that fits snugly in the bore 71 of the large cylindrical end 70 of the smooth expander 62. The external configuration of the insertable small end 63 of the smooth expander 62 fits snugly within the internal configuration of the split bearing puller 31 in its expanded mode. When the push nut 121 is turned clockwise, the shaft extends toward the rear of the engine block carrying with it the bearing line-up bolt 96 and the rear bearing 29 on the split bearing puller 31. The distance from the initial position of the bearing stop line-up bolt 96 to the center of the notch 95 is same as distance from leading edge of bearing 84 to center of oil hole 73 . Thus, when rear line up bolt 96 is in the center of the notch 95, the rear sleeve bearing 29 is at the proper depth within the rear bearing bore 85

As the rear sleeve bearing 29 resides within a blind hole and thus is accessible only from the front of the engine, it is pushed in place. All other bearing bores are accessible from either the front or back. Thus, it is possible to pull them into place.

To proceed, remove the push nut 121, push bar 79, bearing line up bolt 96, and other attachments from engine block, except for flat bar guide. The wing hub 36 is again attached to the engine block as before, see FIG. 8 Insert rod end 12 of rod 10 into the camshaft bore 27. When the threads 12 are visible through the first inspection port 30, place the number one bearing over the end 12 of the rod 10. Push the rod 10 further until the threads 12 are visible in the second inspection port 86 and place No. 2 bearing over the end of the rod. Continue in similar fashion until remaining bearings have been placed over the rod. Most sleeve bearings must be inserted into their respective bearing bore with a particular end first. Thus, care must be taken when placing the sleeve bearings over the rod 10.

When the last bearing is placed over the end 12 of rod 10, the sleeve bearing puller 31, smooth expander 62, snap ring 65, and push washer 66 are pushed onto rod 10 as before. The snap ring 65 is pushed until it snaps into place at the first available congruent notch 13, The bearing stop line-up tool 75 is screwed onto the rod end 12 until the line-up tool 75 cannot be screwed on further Bolt 96 is screwed into tool 75. At the front of the engine block wing hub 36, pull plate 44, thrust bearing 51 and pull nut 53 are assembled as before. As the pulling process results from a clockwise movement of the pull nut 53, an open rod guide 58 should be placed at the bearing bore two bores forward of bearing being installed. That is, if the engine has seven bearings, prior to installing No. 6, an open rod guide 58 is placed in bearing bore No. 4. Using such reference identification, the bearing No. 6 would be next to the last bearing in the engine looking toward the rear of the engine and the flywheel housing 39 which is visible on the rear face of the engine. The references to the bearing numbers are simply for orientation or location purposes and are to be understood to refer to the bearings beginning with the front bearing of the engine as seen in FIG. 6 identified by the reference numeral 29 which would normally be considered as bearing No. 1. When installing the remaining bearings, the rod guide 58 is placed and left in next to the last bearing bore 82.

By hand, the insertable small end 63 of the smooth expander 62 is pushed into the sleeve bearing puller 31 as before, causing the puller to be in its expanded pulling mode. The bearing 29 immediately in front of the expanded puller can be placed onto the expanded puller. The bearing 29 will be several inches from the bore into which it is to be pulled Thus, the pull nut 53 is turned clockwise, causing the rod 10 to bring the assembly forward until the end face 97 of the bearing 29 is tangent with the bearing bore into which it is to reside. As in the extraction process, the smooth expander 62 catches on the snap ring 65, so, when the pull nut 53 is turned clockwise, tension is created and a continuation of clockwise movement of the pull nut 53 will result in the bearing 29 being pulled into the bearing bore. Bearing-line up bolt 96 is on the rear bearing side of the notch 95 in the flat bar guide 72. The center of the bolt 96 is, on each occasion, a certain distance from the center of the notch 95 in the flat bar guide 72. That certain distance is same as the distance from the plane of the circle where the bearing 29 and bearing bore touch to center of the oil hole 73 in the bearing bore. The critical point in the location of each congruent notch is the shoulder 25. Thus, when the leading edge 97 of the bearing to be installed is in place, the bolt 96 is the same distance from the notch 95 as the bearing oil holes 74 are from the oil holes in the bearing bore 73.

To align the bearing oil holes 74 with the bearing bore oil holes, the front bearing line-up tool 77 is used. Line-up tool 77 consists of a handle 99 that functions like the handle on the line-up tool 76. Partial cylinder portion 100 has a peg 101 that functions as peg 90 does. Cylinder portion 100 also has two small posts 102 and 103 that lie directly opposite one another. The diameter of these post are slightly less than the distance between the half-cylindrical shaped sleeves 32 and 33 of the sleeve bearing puller 31 in its expanded pulling mode. Thus, when the bearing 29 has been placed over the end 104 of puller 31, the line-up tool 77 is placed over the end 104 of puller 31. The bearing is turned until the peg 101 is in the notch 106 of the bearing 29. The sleeve bearing puller 31 is turned until the posts 102 and 103 are in the nerf 105 of the expanded puller. Pull the handle 99 of tool 77 down until the handle touches the top face 98 of the flat bar guide 72. Screw the bearing stop line-up tool 75 on the end 12 and screw the bolt 96 into the threads 107. Thus, aligned, the pull nut 53 pulls rod 10 until the bearing 29 is ready to be inserted. The pull nut 53 is turned clockwise until line-up bolt 96 is in the notch 95 of the flat bar guide 72. This procedure results in the bearing 29 being inserted the proper depth and with the bearing oil holes 74 being in line the with engine block oil holes 73

After the initial installation is complete, loosen the pull nut 53 until the smooth expander 62 can be disengaged from the sleeve bearing puller 31 and return to its contracted mode.

To install the bearing immediately in from of the last installed bearing, the split bearing puller 31, smooth expander 62, snap ring 65 and push washer 66 are pushed forward through the bearing bore as before to a position behind the next bore forward. The same process as described above is repeated until all bearings have been installed.

Figures 15, 16, 16A, 16B:
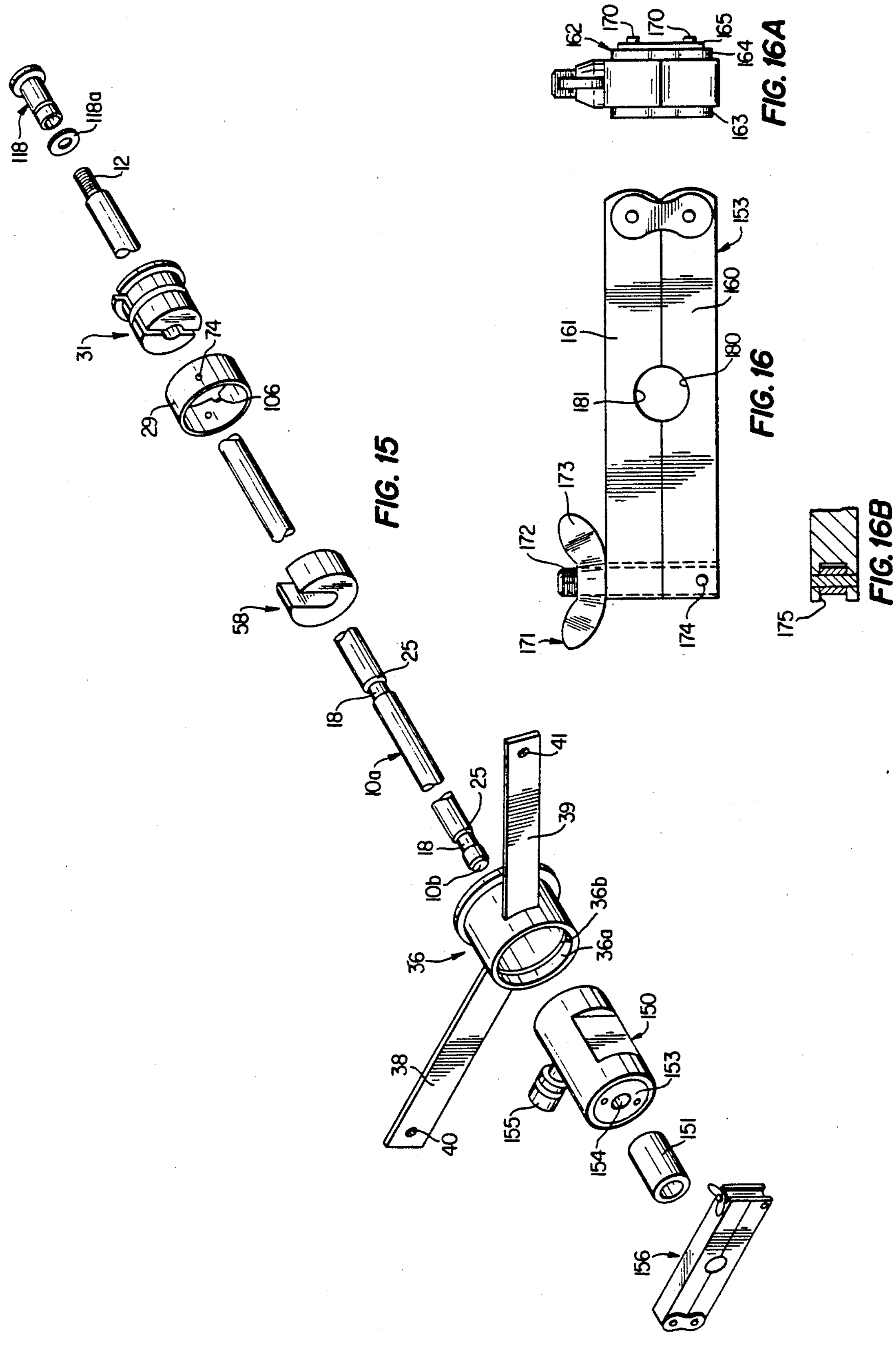
FIG. 15 is an exploded view in perspective of an alternate power-assist embodiment of the invention used for extraction and installation of sleeve bearing.
FIG. 16 is a side view in elevation of a stop assembly used to couple the operator rod with the hydraulic cylinder in the tool assembly shown in FIG. 15.
FIG. 16A is a right end view of the stop assembly of FIG. 16.
FIG. 16B is a view along the line 16B—16B of FIG. 16.
Figure 17:
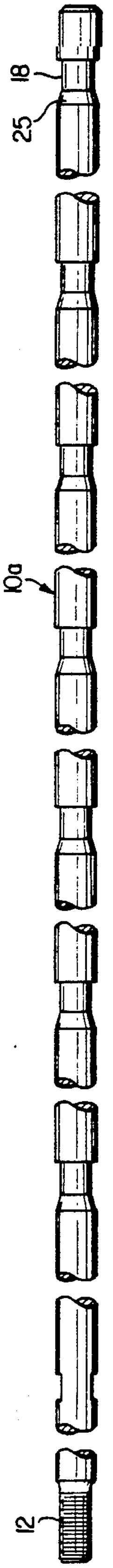
FIG. 17 is a longitudinal broken view in elevation of an operator rod in the assembly of FIG. 15.

With all of the sleeve bearings installed in the camshaft bore of the engine block, the components of the installation assembly illustrated in FIG. 8 are disassembled from the block. The bearing puller 31 and the related parts on the rod are removed from the rod and the rod is pulled from the bore. The bolts connecting the guide bar 72 and the hub 36 are disengaged so that the guide bar and hub are removed from the engine block Referring to FIG. 15, a power assisted sleeve bearing removal and installation assembly for handling all but the back or last bearing includes essentially the same components as illustrated in FIG. 7 and previously described. The hub assembly 36, split rod guide 58, expandable extractor and installer 31, and the expander 118 are identical elements to those shown in FIG. 7. The rod 10A includes a reduced threaded end portion 12, longitudinally spaced notches 18, and along the pulling end 10*b* of the rod has a notch 18 replacing the threaded end portion 11 of the rod 10. Additionally, the assembly of FIG. 15 includes a center hole hydraulic jack 150, a tubular spacer 151, and a stop assembly 156. The hydraulic jack 150 is a standard available power assist unit of the center hole spring return type, a Model C available from the OTC Group of the SPX Corporation, 655 Eisenhower Drive, Owatonna, Minn. 55060. The jack has a tubular reciprocating hydraulic piston 153, provided with an open ended bore 154 sufficiently larger than the diameter of the rod 10A, that the piston may be easily fitted over the end of the rod with the rod passing completely through the bore 154. The cylinder has a side hydraulic supply fitting 155 for supply of hydraulic fluid to the cylinder to reciprocate the tubular piston 153. The stop assembly 156 is illustrated in detail in FIGS. 16, 16A, and 16B. The stop assembly includes bars 160 and 161 hinged together at one end by a hinge assembly 162 including side plates 163, 164, and 165, held together by spaced hinge pins 170 extending through the bars 160 and 161. The free ends of the bars 160 and 161 may be locked together by a wing nut assembly 171 which includes a bolt 172, and a wing nut 173. The bolt 172 is secured by a pivot pin 174 to the free end of the lower bar 160. Both the bars 160 and 161 have endwardly opening slots 175 through which the pin 172 fits. The wing nut assembly is shown in locked position in FIGS. 15 and 16. Loosening of the wing nut 173 on the bolt 172 will permit the wing nut to swing outwardly and downwardly away from the and slot in the upper bar 161 to release the upper bar and lower bars so that they may swing apart on the hinge assembly 162. The bars 160 and 161 have aligned semi-circular recesses 180 and 181 which fit together to form a circle when the bars are closed as in FIG 16. The diameter of the hole formed by the two semi-circular recesses is smaller than the maximum diameter of the rod 10A and slightly larger than the diameter of the reduced notch portion 18 of the rod, so that the stop assembly when locked closed as shown in FIGS. 15 and 16 will clamp on the rod 10A at each of the notches 18, so that a force applied by the hydraulic cylinder to the stop will pull the rod. FIG. 17 shows a detailed view of the rod 10A illustrating the threaded pulling or free end 12 of the rod on which the expander 118 is secured when operating the puller 31. FIG. 17 also illustrates the longitudinal spacing of the notched sections 18 which are arranged with the same spacing along the length of the rod as the camshaft bushing bore sections in the engine block of FIG. 6. The rod 10A is made sufficiently long for out-of-frame overhaul of the engine, that is, when the engine is removed from a vehicle frame and placed on a work stand in a shop, the rod may be used to both pull and reinstall the last bearing at the back or fly wheel end of the engine. The notch 18 at the front or pulling end 10*a* of the rod 10A at the hub 36 is thus provided for the stop 156 when manipulating the last bearing in an engine. For purposes of the present description of the operation of the system of FIG. 15, the engine block illustrated in FIG. 6 shall be considered to have seven camshaft bearings, one at the front, one at the rear in the block just forward of the fly wheel, and five equally spaced along the camshaft bore and accessible through the side ports shown in the engine block. The first step in the installation of the system is the bolting of the wing hub 36 by means of the wings 38 and 39 to the front face 37 of the engine block. Bolts are placed through the bolt holes 40 and 41 in the hub wings into appropriate bolt holes in front of the engine block so that the hub 36 is centrally positioned over the camshaft bore 27 with the central axis of the hub 36 aligned with the longitudinal axis of the camshaft bore. The expander 118 and the washer 118a are then installed on the threaded end 12 of the rod 10A and the bearing puller 31 is placed on the rod over the opposite pulling end 10a of the rod and moved along the rod to the expander 118 against the washer 118a. The rod 10A, with the puller 31 on the expander 118 but sufficiently forward on the expander that the puller halves are collapsed is inserted into the camshaft bore 27 and through the camshaft bore until the puller 31 in collapse condition has been pushed through the last bearing No. 7 at the back of the engine. The split rod guide 58 is put into the block through the side port 78 and inserted into the No. 4 bearing, not shown, around the rod with the opening in the guide facing upwardly so that the guide will support the middle of the rod. The puller 31 in the collapsed condition is manipulated through the No. 7 bearing until the back peripheral flanges on the puller halves snap over the back edge of the bearing. The front edge of the puller halves may be held by the fingers of the operator whose hand is placed through the side port 28 of the engine while the rod is pulled slightly forward toward the front of the engine causing the expander 18 to move farther into the puller halves and expand the halves to the position illustrated in FIG. 2 at which the puller is fully engaged with the bore and the back edge of the bearing. At this position of the rod 10A, the free pulling end 10b of the rod extends through the hub 36 and substantially in front of the hub. The hydraulic jack 150 is placed over the pulling end 10b of the rod with the rod passing through the piston bore hole 154 of the cylinder and is inserted into the counterbore 36a of the hub 36 until the end of the cylinder housing seats on the flange 36b in the hub counterbore. The pulling end 10b of the rod extends from the cylinder bore 154 sufficiently that the spacer 151 is fitted on the rod past the first notch 18 which extends forward of the spacer 151. The stop 156 is then clamped on the pulling end of the rod at the notch 18A. The wing nut 173 is loosened until the bolt 172 is free to pivot on the pin 174 outwardly and downwardly releasing the upper bar 161 to spread the upper bar upwardly from the lower bar 160 opening the stop. The stop is placed on the rod at the notch 18 and closed by swinging the upper and lower bars 161 and 160 together closing the recesses 180 and 181 around the rod at the notch 18. The bolt 172 is pivoted back upwardly into the end notch of the upper bar 161 and the wing nut is tightened clamping the bars 160 and 161 together around the notch 18 of the pulling end of the rod. The hydraulic jack 150 is then actuated causing the piston 153 to move outwardly, to the left as seen in FIG. 15, applying an outward force to the spacer 151 which drives the stop 156 pulling the rod 10A because the stop is clamped tightly to the rod at the notch 18. The rod 10A is pulled by the cylinder until the seventh sleeve bearing 29 has been removed from the back position in the engine block. The operator may then manually reach into the block through the side port 28 and manipulate the bearing and puller 31 forward sufficiently for the puller halves to collapse to the position of FIG. 3 so that the worn bearing may be easily removed in a rearward direction from the bearing puller.

In an out-of-frame overhaul with the engine block in a shop and the fly wheel housing removed, the last or number seven bearing may then be replaced using the system of FIG. 15. The stop 156 and the spacer 151 are removed from the pulling end of the rod 10A and the rod along with the extractor 31 is manipulated back beyond the back face of the engine with the puller 31 extending beyond the back face of the engine. A new bearing 29 is placed on the puller and the puller is manipulated to the expanded position on the expander 118. The bearing 29 is rotated until the seam in the bearing, not shown, is in a vertical position and the notch 106 in a bottom position so that the oil holes 74 will line up with the oil passages in the camshaft bore when the bearing is pulled into the bore in operating position. The stop 156 is clamped on the notch 18 at the pulling end 10b of the rod without the spacer 151 in place. Because the rod 10A had to be extended rearwardly sufficiently to extend out the back of the engine enough to hold the new sleeve bearing, there is not enough length of the rod at the pulling end to accommodate the spacer 151 which is substantially the same length as the sleeve bearing and is used when removing the sleeve bearing, but not pulling new sleeve bearings back into place. With the stop 156 engaged on the pulling end of the rod, the jack 150 is again actuated to pull the No. 7 sleeve bearing into place. It will be recognized, of course, if the engine is being serviced in the vehicle frame with the fly wheel housing in place, the system of FIG. 15 will not work, and thus, that of FIG. 18 must be used to push the bearing into position from inside of the engine. After pulling the No. 7 bearing 29 into place, the rod and expander 118 are manipulated rearwardly to collapse the halves of the puller 31 to release the puller from the sleeve bearing No. 7.

With the installation of the system of FIG. 15 in the engine block, the guide bar 72 is mounted along the side of the engine below the access ports by bolts, not shown, through the holes 111, 112, and 113 extending into the block holes 114, 115, and 116. The guide bar is used for the purpose of aligning the sleeve bearings 29 properly rotationly so that the oil holes 74 in the sleeve bearings communicate with the oil holes in block into the camshaft bore.

After the removal and replacement of the No 7 bearing and the pulling of the rod forward moving the puller 31 into the engine block behind the access port 28, the rod 10A is pulled farther forward and the collapsed puller 31 is manipulated into the bore of the No. 6 bearing and expanded in the bore to engage the bearing on the expanded puller halves. The spacer 151 is placed on the pulling end 10b of the rod and the front face of the piston 153. The stop 156 is clamped on the notch 18 at the front end of the spacer 156. The hydraulic piston 150 is then operated to pull the rod 10 forward extracting the No. 6 bearing 29 which may be retrieved from the puller through the port 82 by manipulating the puller to collapse the puller halves. The stop 156 and spacer 151 are now removed from the pulling end 10b of the rod. The rod and collapsed puller 31 are manipulated back toward the rear of the engine through the No. 6 camshaft bore into the space in the engine behind the side port 28. It will be recognized in pulling the No. 6 bearing and replacing it that the rod 10A will have to be moved forward to the second notch 18 along the rod with the pulling end 10b and the portion of the rod between the pulling end 10b and the second notch 18 extending outwardly from the front of the engine through the piston spacer and stop. The new bearing 29 for installation at the location No. 6 in the engine is placed on the collapsed puller 31 which is then manipulated to expand the puller in the bearing. The bearing must be oriented rotationally so that when it is pulled into place the oil holes 74 will line up with the proper oil holes in the camshaft bore. For purpose of orientation of the sleeve bearing, the tool 76, FIG. 10, is placed on the bearing partially encircle the bearing with the pin 90 inserted in the oil hole 74 on the backside of the bearing. The alignment tool 76 is then rotated until the handle 91 rests along the top edge of the guide bar 72 which properly orients the sleeve bearing. With the stop 156 at the second notch 18 of the rod at the front face of the piston 153 without the spacer 151, the hydraulic jack 150 is actuated to pull the rod and expanded puller and new sleeve bearing No. 6 into place. The bearing is pulled slightly into the sleeve bore to firmly position it but still with the alignment tool 76 in place. The alignment tool is then removed from the bearing. It will be recognized that with the alignment tool engaged with the bearing, the bearing could not be pulled fully into the proper camshaft sleeve bearing bore until removal of the alignment tool. After the alignment tool is removed, the pulling of the bearing into the bore position No. 6 is completed.

The same pulling and replacement procedure is repeated for the sleeve bearing 29 at the bearing position No. 5. During the pulling and replacement of the bearing at positions 5 and 6, the split guide 58 is left in place in the bearing at location No 4 around the rod 10A simply to support the middle of the rod and improve its alignment. During the pulling of the new bearing 29 into the position 5, the alignment tool 77 shown in FIG. 8 is used with the oil holes 74 being engaged by the pin 101 in alignment tool. It will be recognized that in replacing the bearing 29 at the position 5, the rod 10A will again be pulled forward another notch 18. Also, during the pulling of the old bearing the spacer 151 is employed and during the replacement of the old bearing with a new bearing the spacer is not used. At each location of bearing removal and replacement, the puller 31 remains at all times on the end of the rod on the expander 118 which is engaged on the threads 12 of the rod.

During the replacement of the bearing 29 at the location 5 and using the alignment tool 77, the bearing 29 is rotationally positioned with the seam in the bearing at the top and the notch 106 at the bottom. Generally, the bearings at the locations 3 and 5 are tighter bearings and this slightly different procedure using the alignment tool 77 is employed.

After the removal and replacement of the bearing 29 at the position 5, the split guide 58 is removed and the puller 31 is manipulated into the bearing at the No. 4 location, expanded, and the pulling procedure is again repeated using the spacer 151 and the stop 156 engaged at the next rearward notch 18 from the notch 18 used for pulling and replacing the bearing at the location No. 5. In replacing the bearing at the location No. 4 the alignment tool 76 is again used, with the spacer 151 being removed as the bearing is pulled into place.

The pulling and replacement procedure is again repeated for the bearing at the location No 3 using the alignment tool 77 for pulling the bearing in place. The pulling and replacement procedure is again repeated for the bearing at the location No. 2 using the alignment tool 76 during the replacement of the bearing.

After removal and replacement of the bearing at the location No. 2, the puller 31 is again collapsed and the rod and puller are pulled forward moving the puller 31 into the bearing No. 1 and expanding the puller to engage the bearing. With the spacer 151 and the stop 156 in place, the bearing at the location No. 1 is pulled with the bearing moving forward on the rod into the cylindrical cavity of the hub 36. The diameter and the depth of the cavity in the hub 36 accommodates the bearing at the location No. 1 behind the back face of the hydraulic piston 150. The spacer 151 and stop 156 are again removed, the puller 31 is collapsed and the rod and puller are moved backwardly through the bore at the location No. 1 into the space within the side port 86 of the engine block. The new bearing 29 is placed on the puller and manipulated by hand into the camshaft bore at the location 1 using the alignment guide tool 76. With the stop 156 on the notch 18 of the rod 10A in front of the piston 153 of the jack the bearing 29 at the location 1 is pulled into position, removing the alignment tool 76 at the proper time to allow the bearing to be fully pulled into position.

With the last of the bearings replaced at the location one, the bearing system of FIG. 15 is disassembled from the engine block by removing the stop 15 from the rod, collapsing the puller 31, withdrawing the hydraulic jack 150, the rod 10A, and the puller 31 on the rod end. The hub 36 is then disengaged from the engine block by disconnecting the wings 38 and 39 from the block face 37. After removal of the hub from the block, the old bearing 29 may be removed from the cavity in the hub 36.

Figure 18:
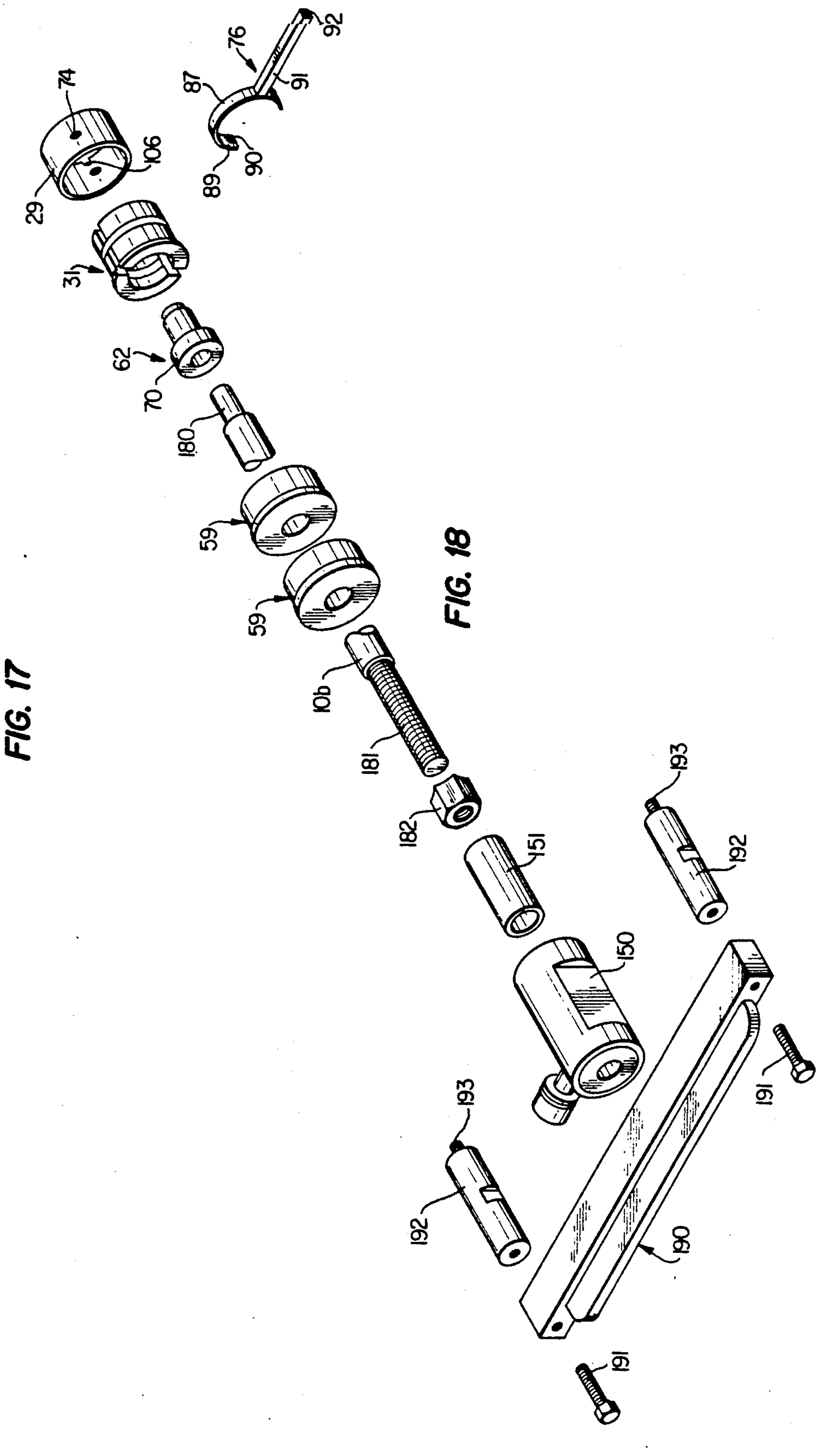
FIG. 18 is an exploded view in perspective of a power-assist form of sleeve bearing installation assembly for installing the back or last sleeve bearing in an engine.

When an engine block is serviced in the vehicle frame with the fly wheel housing in place, it is necessary to use the assembly shown in FIG. 18 to push the bearing 29 into the rear position No. 7 in the engine block. In order to accomplish the pushing function necessary, the system of FIG. 18 differs somewhat from the other previously described systems, resembling more the system of FIG. 10. The components in common with the system of FIG. 10 are the alignment guide tool 76, the bearing puller 31, the expander 62, and the rod guides 59. The rod 10B is similar to the rod 79 including a reduced pushing end portion 180 and a threaded forward end portion 181. The rod 10B does not have reduced notches sections such as the notch sections 18 on the previously described rods. Additionally, the system FIG. 18 includes a nut 182 fitting on the threaded rod section 181. The spacer 151 is the same as used in the previous systems as well as the hydraulic jack 150. In the system of FIG. 18, the hub 36 is replaced by the push bracket 190 which is mounted by the bolts 191 on the mounting rods 192 which have threaded mounting pins 193 fitting in holes in the front face 37 of the engine block to properly position the push bracket 190 across the open end of the camshaft bore 27. The rod 10B and related elements including the bearing puller 31 are assembled in the block first. Rod guides 59 are placed in the previously installed bearings 29 at positions such as three and six along the camshaft bore to properly support the rod 10B. The rod 10B is inserted through the forward end of the camshaft bore 27 and through the guides 59 until the end 180 of the rod is within the access port 28 of the engine block The expander 62 which has an unthreaded smooth bore is placed on the rod end 180 and the bearing puller 31 is positioned on the expander 62. It will be noted that the puller is facing the rear of the engine in the opposite direction from the use of the puller in pulling the bearings from the bore and replacing the bearings as in the previous descriptions. The puller thus becomes a bearing pusher. The No. 7 bearing 29 is then placed on the puller 31 with the puller being expanded to grip the bearing internally. The bearing and puller are then hand manipulated into the camshaft bore at the location No. 7 and the alignment tool 76 is placed around the bearing with the pin 90 engaging the back oil hole 74 in the bearing. It will recognized that the threaded end 181 of the rod **10*b* is extending from the front face 37 of the engine block. The nut 182 and the spacer 151 are placed on the threaded rod end 181. The nut and spacer are manipulated to a location along the threaded rod portion 191 so that rod end will extend into the bore of the piston of the hydraulic jack 150. The positioning of the nut 182 on the threaded rod portion 181 controls the depth to which the cylinder piston may push the sleeve bearing 29 into the camshaft bore at the location No. 7 With the piston 150 on the threaded rod portion outward of the spacer 151, the bracket 190 is mounted on the mounting rods 192 behind the piston to hold the piston forward end against the face 37 of the engine block. The hydraulic jack is operated to start the pushing of the bearing 29 into place. The guide tool 76 is removed when the bearing is properly positioned and the operation of the jack 150 is continued until the bearing 29 has been fully pushed into position. The bracket 190 and mounting rods 192 are removed from the face 37 of the engine block The hydraulic jack 150, the rod 10B, and the puller 31** with the related parts are then disassembled from the engine block.

What is claimed is:

1. Apparatus for removing and installing sleeve bearings in a bore of an engine block comprising:

an operator rod sized and shaped to fit within said bore of said engine block;

means for coupling said operator rod with one face of said engine block when said rod is in said bore of said engine block for pulling and/or pushing said rod longitudinally in said bore of said engine block;

means associated with said operator rod for moving said rod longitudinally in said bore of said engine block; and a sleeve bearing puller sized to fit on and be coupled with said operator rod for removing and installing said sleeve bearings along said bore of said engine responsive to longitudinal movement of said rod and said bearing puller, said bearing puller including a tubular tapered expander mandrel having a bore for fitting said expander on said operator rod, split sleeve extractors fitting together on said expander, said extractors having tapered bore portions for co-acting with said mandrel to permit said mandrel to expand said extractors, and said extractors having external flange portions for engaging each of said sleeve bearings along said bore responsive to longitudinal movement of said operator rod moving said mandrel in said extractors, said extractors being contractible together to a reduced diameter for movement through each of said sleeve bearings and expandable apart to a diameter at which said shoulder on each of said extractors is engageable with an end face of said sleeve bearings.

2. Apparatus for removing and installing sleeve bearings in accordance with claim 1 wherein said operator rod is threaded along a first end portion for coupling said rod with said means for moving said rod and said means for moving said rod comprises an internally threaded elongated nut having an end portion shaped for a drive wrench for driving said rod longitudinally responsive to rotation of said nut on said rod.

3. Apparatus in accordance with claim 2 wherein said means for coupling said operator rod with said engine includes a wing hub having arms connectable with said engine and a cylinder portion fitting around said operator rod, a thrust plate fitting in said cylinder portion of said wing hub, and a thrust bearing fitting around said operator rod in said thrust plate engageable by said nut on said rod to move said rod longitudinally in said bore of said engine block responsive to rotation of said nut.

4. Apparatus in accordance with claim 2 including a thrust plate fitting around said operator rod and engageable in an outer end portion of said bore of said engine block at a face of said block, said thrust plate having a shoulder engageable with said face of said block and said nut fitting on an end portion of said operator rod outward of said thrust plate whereby rotation of said nut on said rod applies a force against said thrust plate as said rod is moved outwardly from said engine bore to pull a sleeve bearing along said bore of said engine.

5. Apparatus in accordance with claim 4 wherein a rear end portion of said operator rod is threaded externally and said tubular tapered expander mandrel is internally threaded and engaged on said rear end portion of said operator rod, and a rod guide fitting on said operator rod between the front and read ends of said rod for supporting said rod along an intermediate portion while operating said rod to pull said end bearing into position.

6. Apparatus in accordance with claim 2 for installing a rear engine camshaft bearing including a split thrust plate shaped to fit around said operator rod within an access port of said engine intersected by said camshaft bore, said split thrust plate having a portion fitting within a front bearing bore hole of said engine and a shoulder engageable around front bearing bore hole said operator nut fitting on a front end of said operator rod through said split thrust plate and extending forward of said thrust plate and said front bearing bore hole for pushing a rear sleeve bearing into operating position along a rear end portion of said camshaft bore in said engine.

7. Apparatus in accordance with claim 6 wherein said rod has a smooth reduced rear end portion, said tubular tapered expander mandrel has a smooth bore fitting on said reduced end portion of said rod with the external portions of said mandrel tapering toward the rear end of said rod, and said split sleeve extractors fitting on said expander positioned for pushing said rear bearing into position responsive to a rearward force on said rod as said rod is driven by said nut.

8. Apparatus in accordance with claim 7 including a bearing alignment bar securable along a side of said engine block aligned with the longitudinal axis of said camshaft bore for use in aligning said sleeve bearings circumferentially in said bore to positioned oil holes in said sleeve bearings with oil flow passages in said block opening into said bore, and an alignment tool having an arcuate segment engageable with said sleeve bearings and a handle engageable with a top edge surface of said alignment bar for properly aligning each of said sleeve bearings.

9. Apparatus in accordance with claim 1 wherein said means associated with said operator rod for moving said rod longitudinally in said bore of said engine block comprises a hydraulic jack adapted to be coupled with an end portion of said rod.

10. Apparatus in accordance with claim 9 wherein said bearing puller is connectable on a rear end portion of said operator rod for sequentially pulling sleeve bearings from operating positions along said camshaft bore to remove said bearings from said bore and pulling replacement sleeve bearings back into operating positions along said camshaft bore, said rod has longitudinally spaced notches each providing a pulling shoulder for sequential engagement of said rod by said hydraulic jack for removing and replacing sleeve bearings at operating positions along said camshaft bore, and a removable clamp engageable with each of said notches along said operator rod in front of said hydraulic jack to couple said jack with said rod at each of said notches as said sleeve bearings are sequentially removed and replaced along said camshaft bore.

11. Apparatus in accordance with claim 9 wherein said operator rod has a reduced rear end portion and said tubular tapered expander mandrel of said bearing puller has a bore sized to receive said reduced end portion of said operator rod for mounting said puller in a bearing pushing position when pushing a rear bearing in said engine block into operating position along said camshaft bore, a push bracket securable with said engine block engageable with said hydraulic jack and means for coupling said hydraulic jack with a frOnt end portion of said operator rod for pushing said rod and said bearing puller to push a rear sleeve bearing into operating position along said camshaft bore.

12. Apparatus in accordance with claim 11 including an alignment bar securable along a side of said engine block having a top edge surface aligned with a longitudinal axis of said camshaft bore for aligning oil holes in said sleeve bearing with oil holes in said engine block opening into said camshaft bore, and an alignment tool engageable with said sleeve bearing and having a handle engageable with said alignment bar for aligning said sleeve bearing.

13. Apparatus for removing and installing sleeve bearings in a bore of an engine block comprising:

an operator rod having longitudinally spaced notches each defining an annular shoulder around said rod;

means for coupling said rod with a face of said engine block when said rod is in said bore of said engine block;

means associated with said rod for moving said rod longitudinally in said bore of said engine block; and a sleeve bearing puller sized to fit on said rod and latch at each said notch against said annular shoulder around said rod along the length of said rod, said sleeve bearing puller including a tubular tapered expander mandrel having a bore for fitting said mandrel on said rod and sliding said mandrel along said rod, split sleeve extractors fitting together on said mandrel, said extractors having tapered bore portions for coacting with said mandrel to permit said mandrel to expand said extractors, and said extractors having external flange portions for engaging each of said sleeve bearings along said bore responsive to longitudinal movement of said rod moving said mandrel in said extractors, said extractors being contractible together to a reduced diameter for movement through each said sleeve bearing and expandable apart to a diameter at which said shoulder on each said extractors is engageable with an end face of each said sleeve bearing.

14. Apparatus in accordance with claim 13 including a snap ring sized to fit on and move along said operator rod and latch at each of said notches against said annular shoulder while engaging an end of said expander mandrel to apply a force from said rod to said mandrel for expanding said extractors.

15. Apparatus in accordance with claim 14 including rod guide means on said operator rod for supporting said rod in said engine block bore between opposite ends of said rod.

16. Apparatus in accordance with claim 15 wherein said means for coupling said operator rod with said engine includes a wing hub having arms collectible with said engine and a cylinder portion fitting around said rod, a puller plate fitting in said cylinder portion of said wing hub, and a thrust bearing fitting around said rod in said thrust plate engageable by a pull nut secured on said rod for turning said rod to move said rod longitudinally in said bore of said engine block.

17. Apparatus in accordance with claim 15 wherein said operator rod is threaded along a first end portion of said rod opposite a second end of said rod coupled with said engine and said expander mandrel is internally threaded for fitting on said rod at said first end to install an end bearing in said engine block at the end opposite said second end of said rod.

18. Apparatus in accordance with claim 17 including an elongated guide bar securable along a side face of said engine block and a bearing lineup tool having a portion having a guide peg fitting in an oil hole of said sleeve bearings and a handle engageable with said guide bar on said engine side face for aligning each of said bearings as said bearing is moved into a bore portion of said engine block to an operating position in said bore of said block.

19. Apparatus in accordance with claim 17 including a thrust plate fitting over said second end of said operator rod and engageable with said engine block and a pull nut engageable on said operator rod in front of said thrust plate for pulling said rod longitudinally to pull said end bearing into said opposite end of said block in said camshaft bore.

20. Apparatus for removing and installing sleeve bearings in a bore of an engine block comprising:

an operator rod having longitudinally spaced notches, each defining an annular shoulder around said rod;

means for coupling said operator rod with said engine block when said rod is in said bore of said engine block including a wing hub having arms connectible with said engine block and a cylinder portion fitting around said operator rod and having a bore sized to receive a front sleeve bearing pulled into said bore from a front position in said camshaft bore, a puller plate fitting in said cylinder portion of said wing hub, a thrust bearing fitting around said operator rod engageable with said puller plate, and a pull nut engageable on threads on a front end portion of said operator rod in front of said thrust bearing to move said rod longitudinally responsive to rotation of said nut;

a split rod guide engageable around said operator rod in said camshaft bore of said engine at one of said sleeve bearings along said bore, said guide having a external cylindrical surface sized to fit within said sleeve bearing to support said operator rod along an intermediate portion of said rod;

a sleeve bearing puller sized to fit on said rod and latch along the length of said rod at each of said notches, said sleeve bearing puller including a tubular tapered expander mandrel having a bore for fitting said mandrel on said operator rod and sliding said mandrel along said rod, split sleeve extractors fitting together on said mandrel, said extractors having tapered bore portions for coacting with said mandrel to permit said mandrel to expand said extractors, said extractors having external flange portions for engaging each of said sleeve bearings along said bore responsive to longitudinal movement of said operator rod moving said mandrel in said extractors, said extractors being contractible together to a reduced diameter for movement through each of said sleeve bearings and expandable to diameter in which said shoulder on each said extractors is engageable with an end face of said sleeve bearing; and a snap ring sized to fit on and move along said operator rod and latch at each of said notches against said annular shoulder while engaging an end of said mandrel to apply a force from said operator rod to said mandrel for expanding said extractors.

21. The apparatus of claim 20 for installing sleeve bearings along said camshaft bore of said engine including an alignment bar connectible along one side of said engine having an upper guide surface alignable with the longitudinal axis of said camshaft bore of said engine, a first bearing lineup tool engageable on said operator bar for aligning each bearing longitudinally in said camshaft bore, said alignment bar having an alignment notch engageable by said first lineup tool, and a second lineup tool engageable with said sleeve bearings for aligning said bearings circumferentially so that oil flow holes in said bearings are aligned with oil flow holes in said engine block opening into said camshaft bore, said second lineup tool having a handle engageable with said top alignment surface of said alignment bar.

22. Apparatus for removal and installation of sleeve bearings in a camshaft bore of an internal combustion engine comprising:

an operator rod sized for longitudinal operation in said camshaft bore, said operator rod having a plurality of annular notches longitudinally spaced along said rod, the first of said notches being located at a front pulling end of said rod and the remainder of said notches being spaced apart distances equal to the spacing of said bearings along said camshaft bore, said rod having a reduced externally threaded rear end portion and wrehch engaging flat portions for attaching a wrench to said rod during installation of said apparatus in an engine;

a bearing puller adapted to be installed on said rear end portion of said rod, said bearing puller including an expander mandrel having an internally threaded bore for engagement on said threads along said end portion of said operator rod, said mandrel having a pulling shoulder and tapered cam and cylindrical holding surfaces, split expandable and contractible sleeve extractors having internal tapered cam and cylindrical surfaces engageable with said expander mandrel surfaces for expansion and contraction of said extractors, and a resilient retainer around said extractors for holding said extractors together around said operator rod and said expander mandrel;

a split operator rod guide engageable in one of said sleeve bearings along said camshaft bore around said operator rod to support a central portion of said rod during operation of said apparatus;

a wing hub having a cylindrical body portion provided with a bore of the length and diameter to receive one of said sleeve bearings pulled into said bore from a rear end of said hub, said hub having a countersunk front bore portion defining a stop shoulder, and radially extending arms on said wing hub for securing said wing hub on a front face of said engine with the longitudinal axis of said bore through said hub being aligned with the longitudinal axis of said camshaft of said engine;

a hydraulic jack having a cylindrical housing and a hollow center piston having bore extending throughout the length of said piston sized to receive said operator rod, said housing of said jack fitting along one end portion into said wing hub against said stop shoulder in said hub for supporting said jack at a position at which the longitudinal axis of said bore of said piston is aligned with the longitudinal axis of said cylindrical housing of said wing hub; and a stop assembly lockable on said operator rod at each of said notches of said rod in front of said hollow piston of said hydraulic jack, said stop being sequentially locked at each of said notches along said rod in front of said hollow piston for removal and installation of a sleeve bearing at each sleeve bearing location in said engine block along said camshaft bore.

23. Apparatus in accordance with claim 22 including a tubular spacer sized to fit on said operator rod in front of said hollow cylinder of said hydraulic jack between said cylinder and said stop assembly at each said notch along said operator rod for pulling each of said sleeve bearings from operating positions along said camshaft bore as said stop assembly and said spacer are moved along said rod to each of said notch portions of said rod.

24. Apparatus in accordance with claim 22 wherein said stop assembly comprises two bar members hinged together at one end and releaseably connectible together at the opposite end, and a wing nut and bolt assembly at said opposite ends for releasing and connecting said opposite ends of bars together, said bars being provided with semi-circular openings which form a circular opening in said assembly when said bars are closed, said circular opening being sized to receive said notch portions of said operator rod when said stop assembly is locked at each said notch portion along said rod.

25. Apparatus in accordance with claim 24 including a tubular spacer sized to fit on said operator rod in front of said hollow piston of said hydraulic jack between said piston and said stop assembly at each of said notches along said operator rod for pulling each of said sleeve bearings from operating positions along said camshaft bore.

26. Apparatus in accordance with claim 24 including an alignment bar securable along a side face of said engine block having a top alignment surface extending parallel with the longitudinal axis of said camshaft bore and alignment tool means engageable with each of said sleeve bearings for aligning said sleeve bearings longitudinally and circumferentially for communicating oil flow holes in said sleeve bearings with oil flow passages in said engine block.

27. Apparatus for installing a camshaft sleeve bearing in a camshaft bore of an engine at an end position in said engine from a location internal of said engine comprising:

an operator rod sized to fit in said camshaft bore extending from the end of said engine in which said sleeve bearing is to be installed along said camshaft bore and outwardly from the opposite end of said engine, said operator rod having a smooth reduced end portion at said first end of said rod and an externally threaded end portion at a second opposite end of said rod;

a sleeve bearing installation device mounted on said first end of said operator rod, said device including a tubular expander mandrel having a smooth bore fitting on said smooth reduced portion of said first end of said rod and a tapered external expander surface for operating said device responsive to longitudinal movement of said expander mandrel, a plurality of split sleeve extractors around said expander mandrel having internal surfaces defining a tapered bore engageable by said expander mandrel to expand and contract said extractors, said extractors having external cylindrical surfaces sized to fit within the bore of said sleeve bearing and end shoulder surface engageable with an end edge of said sleeve bearing, and a resilient retainer encircling said extractors for holding said extractors on said expander mandrel;

rod guide means sized to fit around said rod within sleeve bearings along said camshaft for supporting an intermediate portion of said rod during installation of said end sleeve bearing;

an internally threaded drive nut sized to fit on said threaded second end portion of said operator rod and adjustable along said operator rod for determining the depth to which said end sleeve bearing is pushed into position in said camshaft bore;

a tubular spacer sized to fit on said second end of said operator rod one end of said spacer engaging an end edge of said drive nut;

a hydraulic jack having a tubular hollow center piston having a bore sized to receive said second end portion of said operator rod, a first end edge of said piston being engageable with a second end edge of said spacer when said jack is on said second end portion of said operator rod; and a push bracket having means for mounting said bracket on an end face of said engine block clamping said hydraulic jack between said pusher bracket and said end face of said engine block for holding said jack in position while said piston is operated to push against said spacer and said drive nut to move said operator bar longitudinally into said camshaft bore for pushing said end sleeve bearing into operating position at the first opposite end of said engine block.

28. Apparatus in accordance with claim 27 wherein said push bracket comprises a longitudinal bar engageable along a central portion with an end face of said hydraulic jack and mounting rods connectible with opposite ends of said bar and connectible with said end face of said engine block.

29. Apparatus in accordance with claim 28 including an alignment bar securable along a side face of said engine block having a top edge surface for mounting parallel with the longitudinal axis of said camshaft bore in said engine block and a bearing alignment tool engageable with said end bearing and having a handle engageable with said top edge surface of said alignment bar to properly align oil holes in said bearing with oil passages in said engine block opening into said camshaft.

* * * * *